Aug. 19, 1947.   J. I. MICHAELS   2,425,892
PICKUP BED FOR TRACTORS
Filed May 21, 1945

INVENTOR.
John I. Michaels
BY
Thos. E. Schofield
ATTORNEY

Patented Aug. 19, 1947

2,425,892

UNITED STATES PATENT OFFICE 2,425,892

PICKUP BED FOR TRACTORS

John I. Michaels, Wichita, Kans.

Application May 21, 1945, Serial No. 594,893

3 Claims. (Cl. 224—29)

This invention relates to improvements in pickup beds and refers more particularly to removable pickup bed attachments for tractors. The device is removably attachable to conventional tractors whereby the tractors are converted into units usable for a variety of hauling jobs. Also the pickup bed is a convenient receptacle for weights when required at the rear of the tractor to obtain traction or to counterbalance loads applied ahead of the front axle as, for instance, that incurred when operating a sweep rake and stacker, a utility fork, excavator shovel or scoop, a loader or the like.

Tractors are usually used as a source of power for pulling plows, threshing machines, trailers and other machinery and no provision for a truck bed or pickup bed is made on the tractor itself.

An important object of this invention is to provide a pickup bed attachment for tractors.

A further object of this invention is to provide a pickup bed which is readily mounted on and removed from a tractor.

A further object is to provide a pickup bed having a simple rugged construction.

Other and further objects of this invention will appear from the following description.

Figure 1:
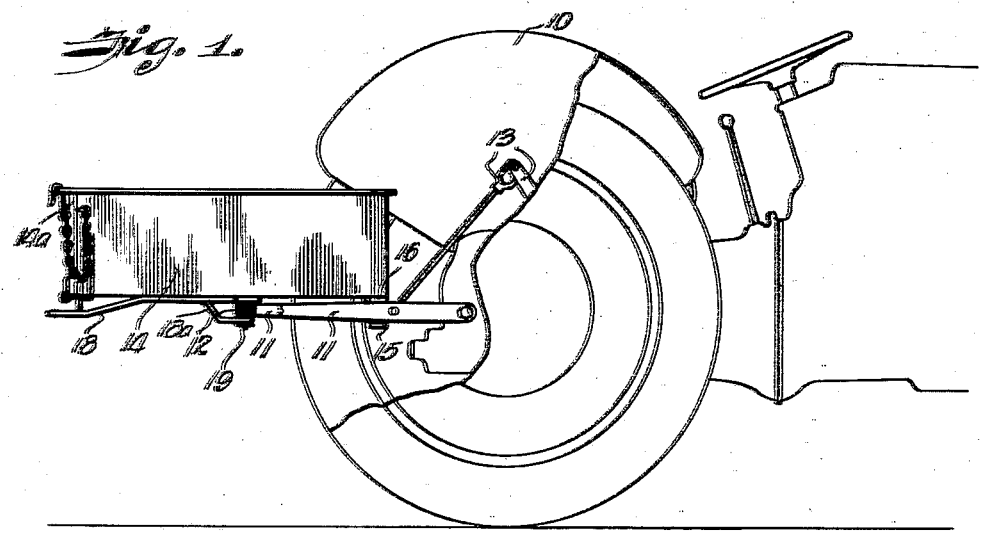
Figure 2:
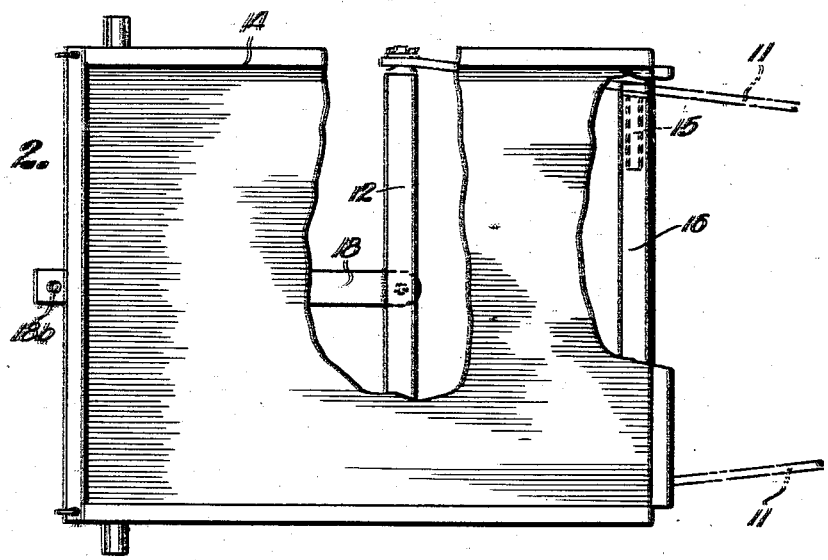
Figure 3:
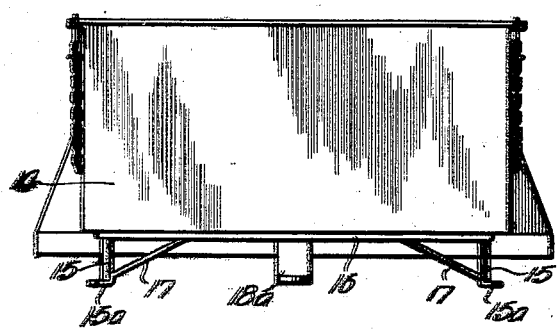

In the accompanying drawings which form a part of the instant specification and are to be read in conjunction therewith and in which like reference numerals are used to indicate like parts in the various views, Fig. 1 is a diagrammatic side elevation of the rear portion of a tractor equipped with a pickup bed embodying this invention, Fig. 2 is an enlarged top plan of the pickup bed with parts broken away, and Fig. 3 is an enlarged front end view of the pickup bed.

Referring to the drawings, particularly Fig. 1, the numeral 10 represents a diagrammatic showing of the rear portion of a tractor on which the pickup bed is mounted. For purposes of illustration a Ford tractor is shown but it is to be understood that the pickup bed may be mounted on any tractor having tension links and a transverse drawbar. The tension links 11 are pivoted at one end to the chassis of the tractor. Supported between the free ends of the links is a drawbar or crossbar 12. Intermediate the ends of links 11 are attached linkage 13 connected to a hydraulic lift, usually conventional equipment on tractors.

The pickup bed comprises a box-like receptacle 14 equipped with an endgate 14a. Brackets 15 depend from the front corners of the receptacle 14. The extremities of the brackets are turned outwardly to form flanges 15a. The brackets are attached to a crossbar or support 16 at an angle to the longitudinal axis of the receptacle as shown in Fig. 3. This conforms the brackets with the tension links so the outside faces of the brackets fit snugly against the inner faces of the links when the receptacle is mounted thereon. The extremities of crossbar 16 extend slightly beyond the brackets 15 forming flanges overlapping the upper edges of the links thus causing the links to be wedged between the flanges above and below the brackets. Diagonal supports 17 give additional support to the ears. A longitudinal drawbar mounted beneath receptacle 14 has a bracket 18a near its front end. The bracket fits under drawbar 12 and is held rigidly in position by a pin 19 which is inserted in registering holes in the bottom of the bed, the longitudinal drawbar 18, transverse drawbar 12 and the bracket 18a. The lower end of the pin is drilled to receive a cotter pin to prevent displacement. The rear end of drawbar 18 is offset slightly below the bottom of receptacle 14 and has an aperture 18b to which may be fastened vehicles or equipment to be drawn by the tractor.

It is believed that the operation of the device is obvious from the foregoing description. Receptacle 14 is slid forwardly on the tension links 11 until brackets 15 engage the sides of the tension links and bracket 18a fits under drawbar 12. In this position pin 19 is dropped into the registering holes in the drawbars and bracket and a cotter pin or nut affixed to the end of the pin. The receptacle or pickup bed is thus rigidly held upon the tension links and crossbar and may be used for innumerable and varied light hauling jobs. In addition the pickup bed forms a receptacle for weights placed therein when it becomes necessary to obtain traction for the rear wheels or to offset loads applied ahead of the front axle.

It will be seen that the objects of this invention have been accomplished. There has been provided a pickup bed readily mounted upon or removed from a tractor having tension links and a transverse drawbar. The arrangement is such that the pickup bed may be emptied by opening the endgate and dropping the tension links to their lowest position.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described my invention, I claim:

1. A pickup bed for a tractor equipped with a tension link drawbar assembly, comprising a box-like receptacle, brackets mounted beneath the receptacle engageable with the tension links, and means for removably securing said receptacle to said drawbar, said means comprising a longitudinal member beneath the receptacle, a bracket formed at one end thereof adapted to engage the tractor drawbar, said drawbar, longitudinal member, bracket and receptacle having registering holes, and a pin insertable in said holes to hold the assembly in position.

2. A pickup bed for a tractor equipped with a tension link drawbar assembly comprising a box-like receptacle, means for removably securing said receptacle to said drawbar so that said receptacle is disposed approximately equally on either side of said drawbar, and bracket means on one end of said receptacle engageable with the tension links to prevent rotation of said receptacle about said drawbar.

3. A pickup bed for a tractor equipped with a horizontal drawbar connected to the tractor by two substantially horizontal tension links, comprising a box-like receptacle resting upon said drawbar so that said receptacle is disposed approximately equally on either side of said drawbar, a pin passing through registering holes in said receptacle and said drawbar to prevent said receptacle from shifting with respect to said drawbar, and brackets on said receptacle to secure one end thereof to said tension links.

JOHN I. MICHAELS.

REFERENCES CITED

The following references are of record in the file of this patent:

UNITED STATES PATENTS

| Number | Name | Date |
|---|---|---|
| 1,647,120 | Ballon | Nov. 1, 1927 |
| 1,852,200 | Camp | Apr. 5, 1932 |
| 1,854,946 | Loring | Apr. 19, 1932 |
| 1,865,365 | Foote | June 28, 1932 |
| 1,941,860 | Hanson | Jan. 2, 1934 |
| 2,254,292 | Jones | Sept. 2, 1941 |
| 2,349,335 | Baldwin | May 23, 1944 |